(12) United States Patent
Winter et al.

(10) Patent No.: US 8,466,926 B2
(45) Date of Patent: Jun. 18, 2013

(54) RENDERER FOR PRESENTING AN IMAGE FRAME BY HELP OF A SET OF DISPLAYING COMMANDS

(75) Inventors: Marco Winter, Hannover (DE); Dirk Gandolph, Ronnenberg (DE); Jobst Hoerentrup, Wennigsen (DE); Ralf Ostermann, Hannover (DE); Andrej Schewzow, Hannover (DE)

(73) Assignee: Thomson Licensing, Issy-les-Moulineaux (FR)

( * ) Notice: Subject to any disclaimer, the term of this patent is extended or adjusted under 35 U.S.C. 154(b) by 888 days.

(21) Appl. No.: 12/151,745

(22) Filed: May 8, 2008

(65) Prior Publication Data

US 2008/0278510 A1   Nov. 13, 2008

(30) Foreign Application Priority Data

May 11, 2007 (EP) .................................... 07108035

(51) Int. Cl.
*G09G 5/36* (2006.01)
*G09G 5/399* (2006.01)

(52) U.S. Cl.
USPC ............................ 345/545; 345/539; 345/548

(58) Field of Classification Search
USPC .................. 345/545, 539, 547, 548
See application file for complete search history.

(56) References Cited

U.S. PATENT DOCUMENTS

| 6,496,198 | B1 * | 12/2002 | Wang | 345/629 |
| 7,034,791 | B1 * | 4/2006 | Odom | 345/98 |
| 7,623,140 | B1 * | 11/2009 | Yeh et al. | 345/629 |
| 2005/0144189 | A1 * | 6/2005 | Edwards et al. | 707/102 |

FOREIGN PATENT DOCUMENTS

| EP | 1396997 | 3/2004 |
| WO | WO 99/52093 A | 10/1999 |

* cited by examiner

*Primary Examiner* — Hau Nguyen
(74) *Attorney, Agent, or Firm* — Myers Wolin, LLC (57) ABSTRACT

The invention is related to a device for presenting, an image frame by help of a set of displaying commands wherein a displaying command comprises a displaying area and a displaying content.

The device comprises means for adapting a first and/or a second displaying command set such that an adapted displaying command sets comprises displaying areas which do not intersect with any displaying area of the same set. Furthermore, the displaying areas of an adapted set cover a display area the image frames are displayed on. The device further determines displaying commands of the adapted second set not comprised in the adapted first set. Then, the determined displaying commands are executed.

Adaptation makes comparison of displaying commands suitable for excluding areas from displaying/blitting/clearing.

9 Claims, 11 Drawing Sheets

| R1: CLR | R2: CLR | R3: O1 | R5: CLR | R6: CLR | R7: O2 | R8: CLR | R9: CLR |

R4: CLR

C_CURRENT

Figure 8

| R1: CLR | R3: O1 | R4: CLR | R5: CLR | R7: O2 | R8: CLR |
|---------|--------|---------|---------|--------|---------|
|         | R2: CLR |        |         |        |         |
|         |        |         | R6: CLR |        |         |
|         |        |         | R9: CLR |        |         |

C_NEXT

Figure 9

| R1: CLR | | | | | | |
|---|---|---|---|---|---|---|
| R2: CLR | R3: O1 | R4: CLR | | | | |
| R5: CLR | | | | | | |
| R6: CLR | | R7: CLR | R8: CLR | | | |
| R9: CLR | | R10: O2 | R11: CLR | | | |
| R12: CLR | | R13: O2 | R14: CLR | | | |
| R15: CLR | | | | | | |

C_CURRENT'

Figure 10

| R1: CLR | | | | | | |
|---|---|---|---|---|---|---|
| R2: CLR | R3: O1 | R4: CLR | | | | |
| R5: CLR | | | | | | |
| R6: CLR | R7: O2 | | R8: CLR | | | |
| R9: CLR | R10: O2 | | R11: CLR | | | |
| R12: CLR | R13: CLR | | R14: CLR | | | |
| R15: CLR | | | | | | |

C_NEXT

Figure 11

RENDERER FOR PRESENTING AN IMAGE FRAME BY HELP OF A SET OF DISPLAYING COMMANDS

This application claims the benefit, under 35 U.S.C. §119 of European Patent Application No. 07108035.2, filed May 11, 2007.

BACKGROUND

The invention is related to a renderer for presenting, an image frame by help of a set of displaying commands. The invention is also related to a corresponding method.

A renderer receives displaying commands at its input and in turn executes displaying commands on an underlying platform's graphics system. By help of the renderer image frame sequences of a movie or of a computer animation as well as mixtures of still or moving images and animations can be presented on a display. For instance, an interactive menu related to a movie can be presented together with the movie.

To avoid artefacts or flickering the renderer executes the displaying commands on a back buffer while the screen is refreshed according to a screen refresh rate from a front buffer. After all executing all displaying commands related to a next image frame in the back buffer, all pixel values of the back buffer are blitted to the front buffer. That is, the pixel values in the back buffer are copied, preferably in a burst, to the front buffer. Then, the back buffer is cleared and displaying commands related to a image frame following the next image frame are executed by the renderer.

Executing of displaying commands, blitting and clearing are compute-intensive tasks. Therefore, presenting image frame sequences with a high image frame rate and/or high resolution still challenges the computational power and the graphics system of devices with embedded processors, like BD-players or mobile phones. To exclude unchanged pixels from displaying/blitting/clearing, a pixel-by-pixel comparison between the currently presented image frame in the front buffer and the next image frame in the back buffer appears as a straight forward solution. But, this comparison is as costly in terms of computational power, itself, that it almost provides no benefit.

Thus, there is a need for a renderer which allow rendering and presenting of image frame sequences with a high image frame rate and/or high resolution in face of limited computational power and for a respective method for presenting of image frame sequences.

INVENTION

This is achieved by a renderer for presenting an image frame by help of a set of displaying commands wherein a displaying command comprises a displaying area as well as displaying content to be displayed in the displaying area and wherein the renderer comprises the features of claim 1.

The renderer comprises means for adapting a first displaying command set for displaying a preceding image frame and/or a second displaying command set for displaying a subsequent image frame such that an adapted displaying command set comprises only displaying areas which do not intersect with any displaying area of the same set. Furthermore, the displaying areas of an adapted displaying command set cover an area the image frames are presented on. Said renderer further comprises means for determining displaying commands of the adapted second set which are not comprised in the adapted first set. As well, said renderer is adapted to execute the determined displaying commands.

Adaption of command sets makes the command sets comparable. Comparison of displaying commands reduces the amount of comparisons and still allows for excluding large areas of the back buffer from displaying/blitting/clearing.

In a preferred embodiment of the renderer, displaying areas are rectangular. Furthermore, the determining means are adapted to determine whether a displaying command for the same displaying rectangle is comprised in the adapted first set, and if so, to determine whether the displaying command of the adapted first set for said same displaying rectangle comprises the same displaying content. Then, comparing displaying commands can be performed fast.

In another preferred embodiment, the adapting means are suited for further adaptation of the adapted first displaying command set and/or the adapted second displaying command set. Further adaptation is achieved by formation of an auxiliary set of displaying rectangles. In this other preferred embodiment, each displaying rectangle of the auxiliary set is a subarea of a displaying rectangle of the adapted first set. Moreover, each displaying rectangle of the auxiliary set is a subarea of a displaying rectangle of the adapted second set. Within said other preferred embodiment the adapting means are suitable for decomposing the displaying commands of the adapted first set and/or of the adapted second set. That is, if a displaying command is for a displaying rectangle not comprised in the auxiliary set, it is decomposed into a subset of displaying commands for displaying rectangles of the auxiliary set. Within this other preferred embodiment for each displaying command of the further adapted second set of decomposed displaying commands, it is determined only whether the displaying command of the further adapted first set for said same displaying rectangle comprises the same displaying content. This reduces size and number of areas to be redisplayed.

It is further preferred if displaying content comprises a number of layer objects, each comprising a graphical object and position information as well as alpha composition information related to said graphical object. Then, determination whether a displaying command of the further adapted first set comprises the same displaying content as a displaying command of the further adapted second set comprises determination, whether said displaying command of the further adapted first set comprises the same number of layer objects and, in each layer object, the same graphical object, the same position information and the same alpha composition information as said displaying command of the further adapted second set.

This allows for accelerating comparison.

In yet another preferred embodiment, the renderer also comprises a database adapted for storing sets of displaying commands. Within the data base a section is dedicated to the preceding image frame. This section is for storing the adapted first set or the further adapted first set of displaying commands. Another section of the database is dedicated to the subsequent image frame. This other section is for storing the adapted second set or the further adapted second set of displaying commands. In this yet another preferred embodiment the render also comprises means for erasing one of the database sections and means for exchanging the dedication of the database sections.

The invention is further related to a method for presenting an image frame displayed by help of a set of displaying commands wherein a displaying command comprises a displaying area as well as displaying content and wherein the method comprises the features of claim 6.

Said method for presenting an image frame comprises the steps of adapting a first displaying command set for displaying a preceding image frame and/or a second displaying command set for displaying a subsequent image frame such that an adapted displaying command set comprises only displaying areas which do not intersect with any displaying area of the same set and such that the displaying areas of an adapted displaying command set covers an area the image frames are presented on. The method further comprises the step of determining for each displaying command of the adapted second set whether the adapted first set comprises the same displaying command, and if not, the step of executing the respective displaying command.

Preferred embodiments of the inventive method are characterized by the features of the claims depending on claim 6.

DRAWINGS

Exemplary embodiments of the invention are explained by help of the drawings in more detail in the following description.

In the figures.

EXEMPLARY EMBODIMENTS

Technically, an animation, a movie or a composition of both is achieved by presenting a sequence of image frames in a relatively short time. Each image frame of the sequence has an associated area and defined pixel values therein. In computer animation and some kind of digital movies, a image frame is composed from a number of graphical objects; it is also often referred to as a "composition".

In an exemplary embodiment, a COMPOSITION is defined by a set of RENDER_RECT objects sRENDER_RECT, where sRENDER_RECT has the following properties:

1. It is made up of one or more RENDER_RECT objects
2. Each RENDER_RECT object defines a rectangular sub-area within the display area
3. RENDER_RECT objects do not overlap
4. In general, sRENDER_RECT completely covers the display area. If not, areas which are not covered by any RENDER_RECT object are implicitly defined as "empty"/"clear".

Each RENDER_RECT comprises an ordered set of LAYER objects. Layers determine a z-order within a RENDER_RECT object. In the exemplary embodiment, the bounds of each layer of a RENDER_RECT are the bounds of the parent RENDER_RECT object and serve as clipping bounds when rendering the layer. A LAYER object has the following properties:

1. An associated graphical object. For example, this can be a part of a computer animation or a text or any other graphical object.
2. Position information related to the graphical object
3. Alpha Composition information related to the graphical object
4. Depending on the associated graphical object, it may have a colour and/or a font property (e.g. for text)

A variant of LAYER object is a text LAYER object. Text LAYER objects further comprise one or more font properties.

Two LAYER objects are identical, if
  The associated graphical objects are the same
  Position information related to the graphical objects are the same
  Alpha Composition information related to the graphical objects are the same
  If present, the associated colours are the same
  If present, the associated fonts are the same Further, two RENDER_RECT objects are identical, if
  The size and position of the respective rectangular sub-areas are identical
  The number of layer objects of each RENDER_RECT are identical
  Pair-wise comparison of corresponding LAYER objects reveals that the respective LAYER objects are identical. Pair-wise comparison means comparison of two layer objects with the same stacking depth.

By help of these concepts an exemplary renderer can perform differential rendering of a next image frame in dependency on a currently presented image frame. A state model of said exemplary renderer has two main states: The "COMPOSITING" state and the "DISPLAYING" state. At any time, the exemplary renderer is in one of these states.

In the COMPOSITING state, the exemplary renderer receives displaying commands from an application and makes up a next composition.

In the DISPLAYING state, among others, the exemplary renderer compares the next composition with a current composition. This comparison yields areas which have changed. The exemplary renderer executes only RENDER_RECT objects which correspond to these areas. The to-be-executed RENDER_RECT objects are separated in two set. A first set comprises RENDER_RECT objects with two or more LAYER objects and a second set comprises RENDER_RECT objects with exactly one LAYER object. RENDER_RECT objects of the first set are executed on a back buffer. Then, the respective areas are blitted from the back buffer to a front buffer. RENDER_RECT objects of the second set are executed on the front buffer, directly. Still remaining areas of the front buffer are kept unchanged.

The screen is refreshed from the front buffer entirely according to a screen refresh rate. Thus, screen refreshing can be independent from rendering.

The exemplary renderer's operations in each state are described in detail in the following.

In an advantageous exemplary embodiment, a database is created and maintained by the exemplary renderer. The database consists of two main parts or sections: The first part or section is dedicated to the current image frame. This section comprises a currently presented composition C_CURRENT which is an instance of COMPOSITION. The second part or section is dedicated to the next image frame. It comprises a "next" composition C_NEXT which is also an instance of COMPOSITION.

COMPOSITING State

Figure 1:
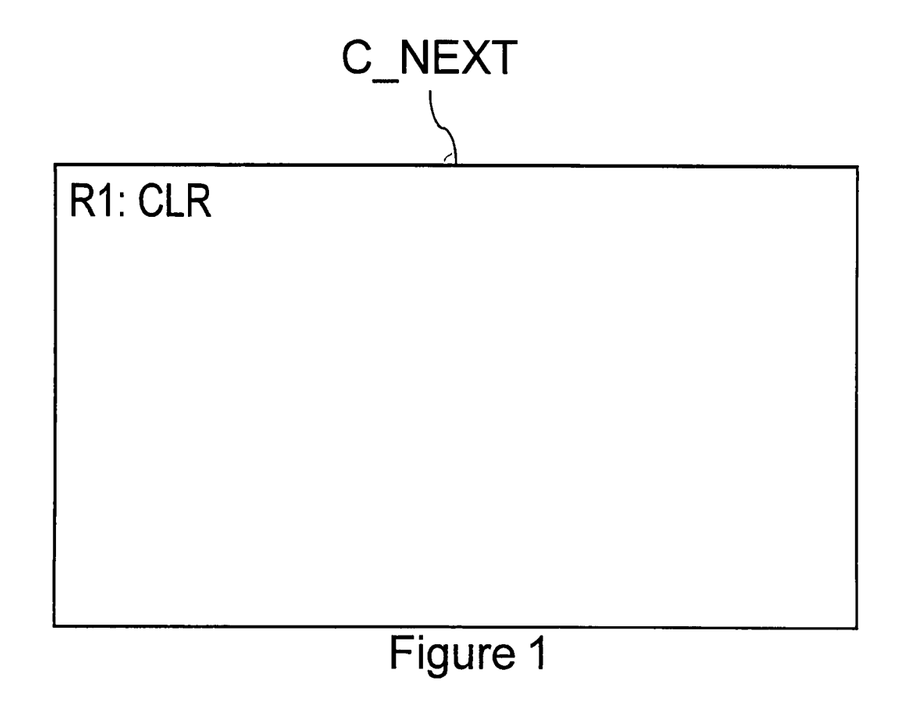
FIG. 1 depicts an example for a next composition C_NEXT
Figure 2:
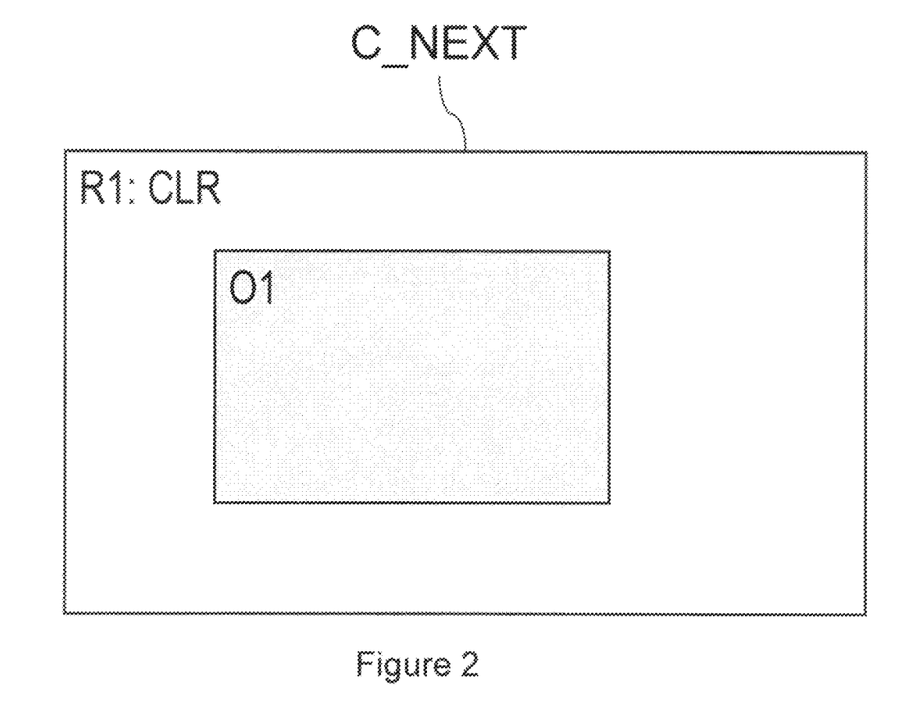
FIG. 2 depicts an exemplary next composition C_NEXT after a first modification.
Figure 3:
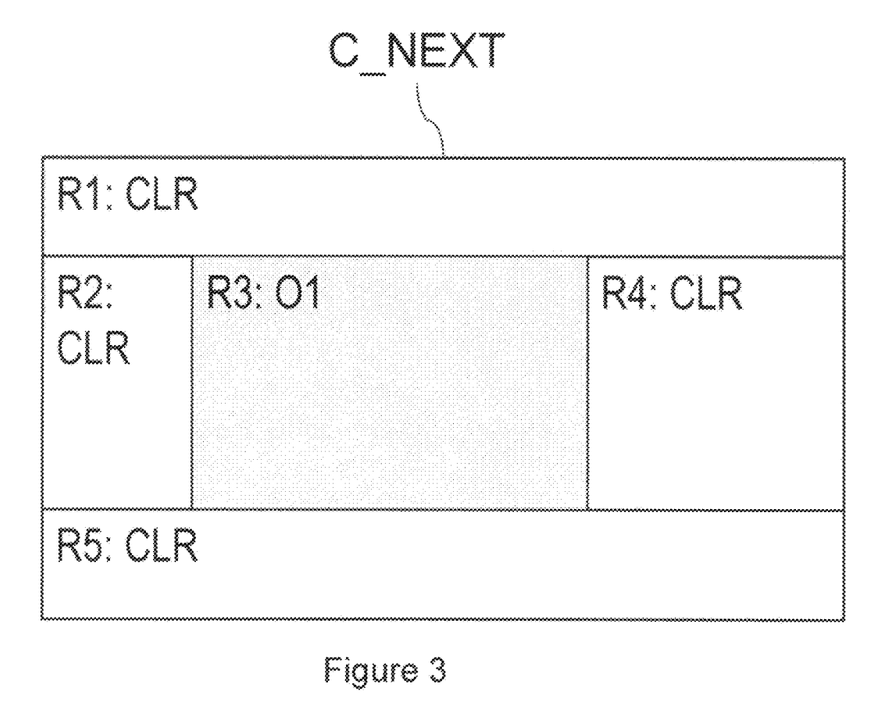
FIG. 3 depicts the exemplary next composition C_NEXT of FIG. 2 after a second modification.
Figure 4:
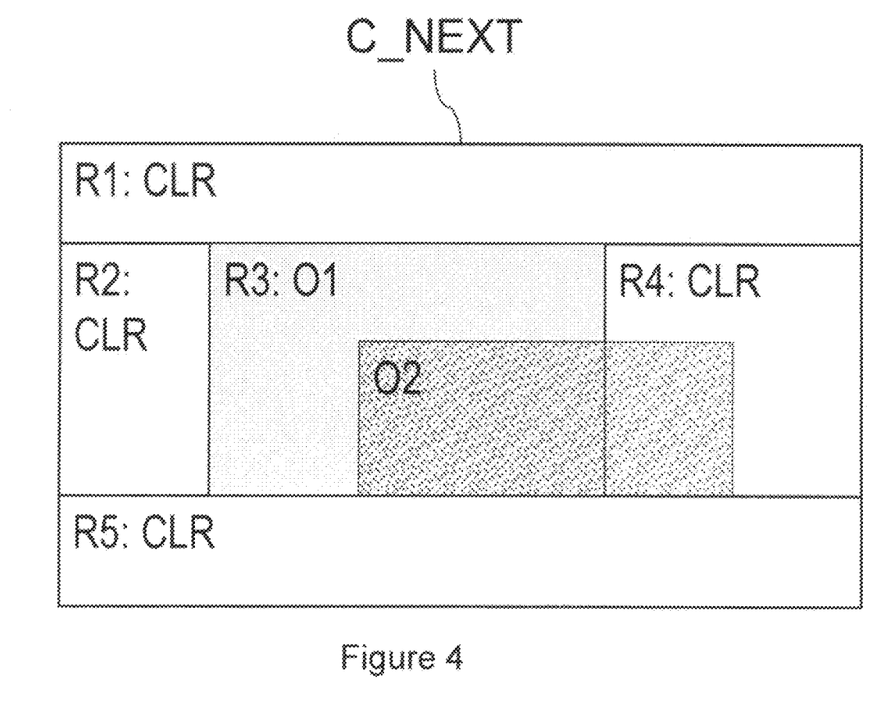
FIG. 4 depicts the exemplary next composition C_NEXT of FIG. 3 after a third modification.
Figure 5:
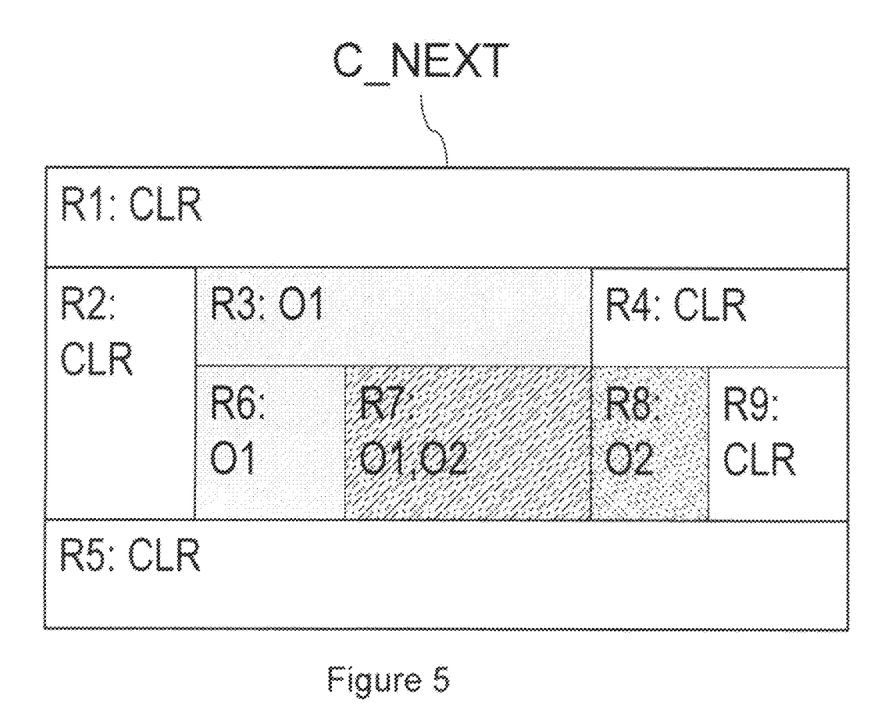
FIG. 5 depicts the exemplary next composition C_NEXT of FIG. 4 after a fourth modification.

Any displaying command received by the renderer is transformed into one or more RENDER-RECT objects of the next composition C_NEXT. Initially, C_NEXT typically contains one single RENDER_RECT object R1. The composition information specifies that all pixel values are clear CLR. FIG. 1 depicts C_NEXT. A command instructs the renderer to present a graphical object O1 somewhere in the display area. The exemplary renderer modifies C_NEXT, accordingly, as depicted in FIG. 2. The former RENDER_RECT object R1 must be decomposed, since according to the definition of a COMPOSITION, RENDER_RECT objects must not overlap. Other decompositions than illustrated in FIG. 3 are possible, but preferably, the exemplary renderer modifies RENDER_RECT object R1 and creates RENDER_RECT objects R2, R3, R4 and R5 of maximum width according to a horizontal decomposition, as illustrated. A command instructs the exemplary renderer to present another graphical object O2. The exemplary renderer modifies C_NEXT, accordingly, as depicted in FIG. 4. The former RENDER_RECT object R3 as well as the former RENDER_RECT object R4 must be decomposed. That is, the exemplary renderer modifies the RENDER_RECT objects R3 and R4 and creates new RENDER_RECT objects R6, R7, R8 and R9. Afterwards, RENDER_RECT object R7 comprises two layer objects, a first layer object comprising graphical object O1 and a second layer object comprising graphical object O2 as depicted in FIG. 5.

The first layer object holds the following information:
A reference to the graphical object O1
The position of object O1
Information on alpha composition
A displaying colour (depending on the type of O1)
A displaying font (depending on the type of O1)
The second layer object holds the following information:
A reference to the graphical object O2
The position of object O2
Information on alpha composition
A displaying colour (depending on the type of O2)
A displaying font (depending on the type of O2)

The exemplary renderer may support clear commands CLR. Such commands conceptually fill pixel values in a region, usually according a predefined colour including full transparency. This command is supported very efficiently.

Figure 6:
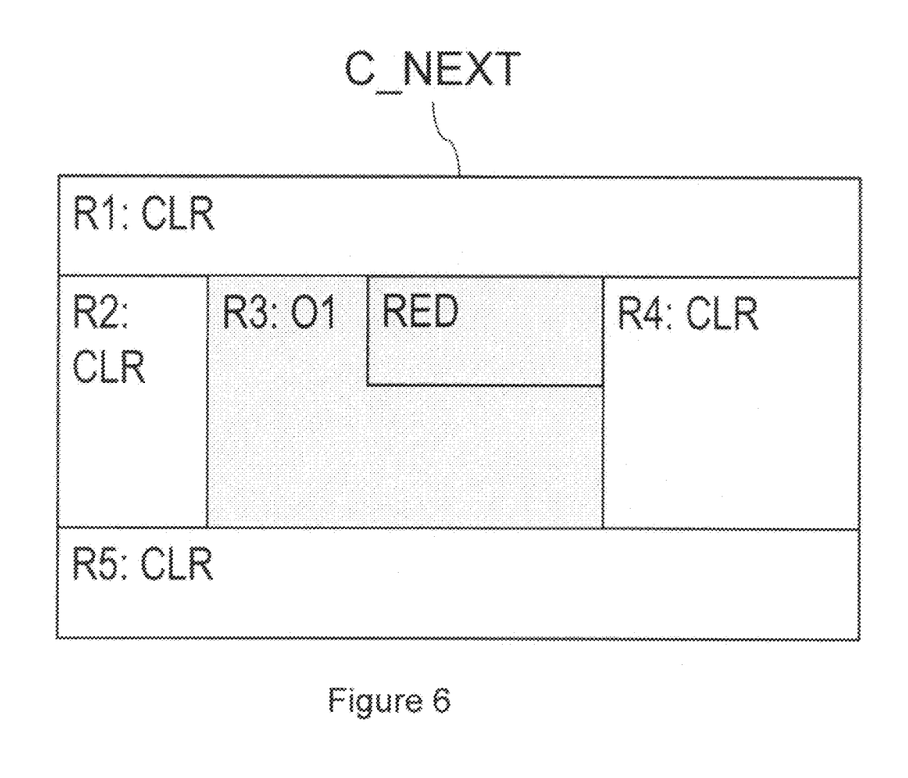
FIG. 6 depicts the exemplary next composition C_NEXT of FIG. 3 after another third modification.

Exemplarily for application of a clear command CLR, the composition describes a single object O1 as depicted in FIG. 6. A CLR command is received to clear a region RED.

Figure 7:
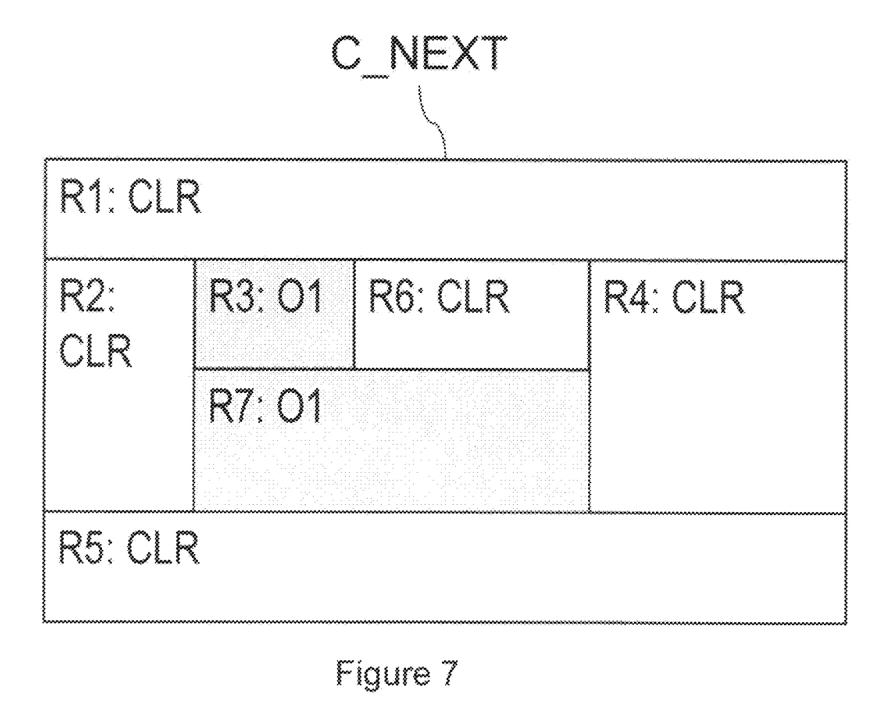
FIG. 7 depicts the exemplary next composition C_NEXT of FIG. 6 after another fourth modification.

The exemplary renderer modifies C_NEXT, such that the former RENDER_RECT object R3 is modified and two additional RENDER_RECT objects R6, R7 are formed as depicted in FIG. 7.

DISPLAYING State

During DISPLAYING state, the exemplary renderer brings the front buffer in conformity with the next composition C_NEXT. To do so, the exemplary renderer compares the differences between the current composition C_CURRENT with the next composition C_NEXT. The "difference" between these two describes the areas or disjunctive rectangles for which visual content has changed between the image frame currently displayed and the next image frame. Therefore, these areas or disjunctive rectangles need to be redisplayed.

In the example depicted in FIGS. 8 to 11, the even-numbered figures illustrate C_CURRENT (current composition) and the odd-numbered figures illustrate C_NEXT (next composition).

Each composition in FIGS. 8 to 11 shows 2 graphical objects: O1 and O2. All other areas are "empty". From the current composition to the next composition, the position of object O1 does not change. Object O2 moves downwards. Both compositions C_CURRENT and C_NEXT are decomposed into nine different RENDER_RECT objects R1, R2, R3, R4, R5, r6, R7, R8 and R9. In both compositions area R3 holds object O1 and area R7 holds object O2. But, the position of R7 differs in the two compositions. As well, size and/or position of the RENDER_RECT objects R5, R6, R8 and R9 differ in the two compositions.

During DISPLAYING state, the exemplary renderer passes four phases:

Phase 1:

The exemplary renderer compares the two compositions by comparing RENDER_RECT objects:
For R1, it detects that they are identical
For R2, it detects that they are identical
For R3, it detects that they are identical
For R4, it detects that they are identical
For R5, it detects that they are NOT identical.
For R6, it detects that they are NOT identical.
For R7, it detects that they are NOT identical.
For R8, it detects that they are NOT identical.
For R9, it detects that they are NOT identical.

In case the exemplary renderer would detect that all RENDER_RECT objects are identical, it would immediately pass on to Phase 4.

In yet another exemplary embodiment of the renderer, the set of RENDER_RECT objects which are not identical are defined as sDIFF and the exemplary renderer would pass on to Phase 2 immediately. For the given example, the exemplary renderer would decide to execute the RENDER_RECT objects R5, R6, R7, R8 and R9.

Figure 8:
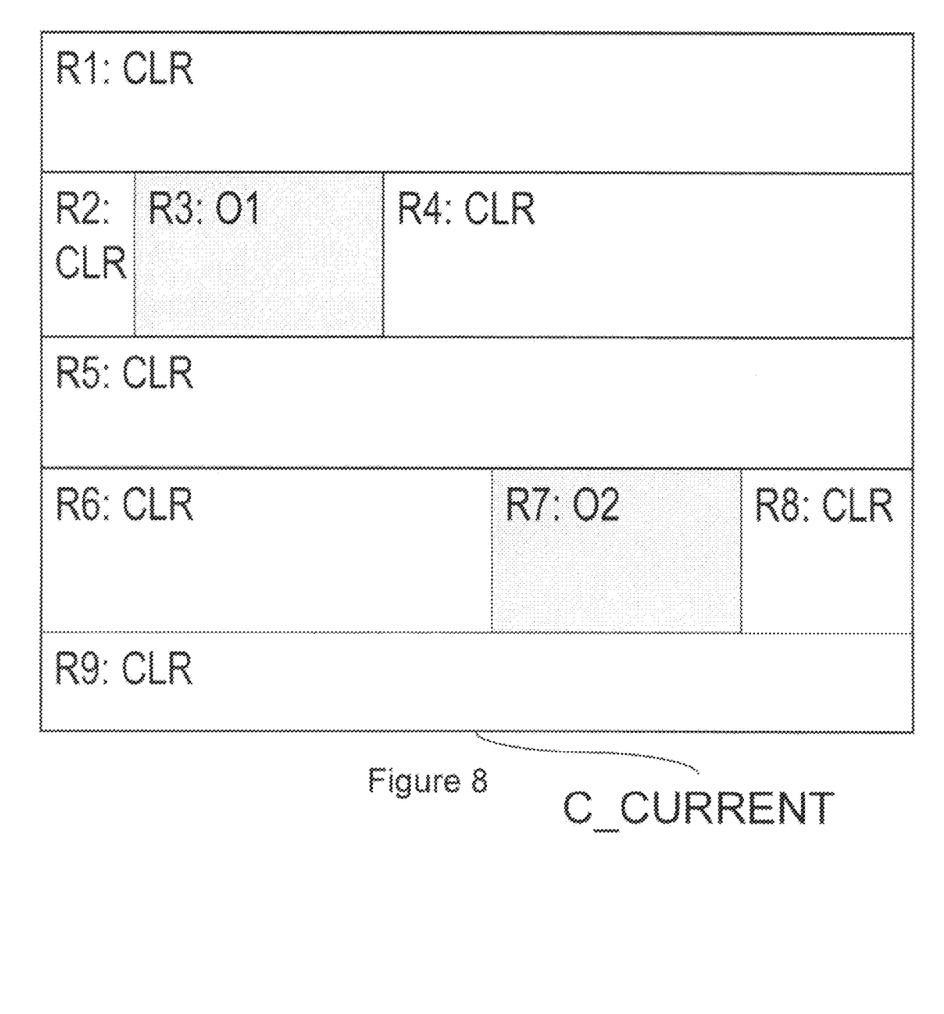
FIG. 8 depicts an exemplary currently presented composition C_CURRENT.
Figure 9:
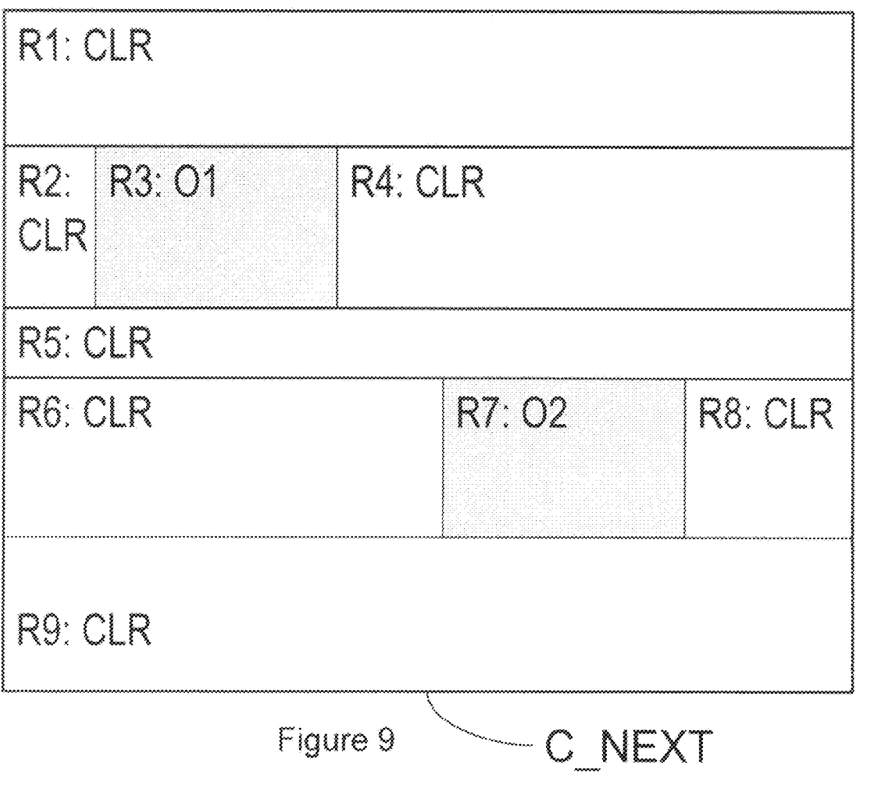
FIG. 9 depicts another exemplary next composition C_NEXT.

In a further exemplary embodiment of the renderer, the exemplary renderer applies a DEC-function to the two exemplary compositions of FIG. 8 and FIG. 9. The DEC-function takes the two compositions C_NEXT and C_CURRENT of FIG. 8 and FIG. 9 as input and outputs modified versions C_NEXT' and C_CURRENT' depicted in FIG. 10 and FIG. 11, respectively, wherein:
  C_NEXT' is graphically equivalent to C_NEXT,
  C_CURRENT' is graphically equivalent to C_CURRENT, and
  for any RENDER_RECT in C_CURRENT', a corresponding RENDER_RECT in C_NEXT' exists with a rectangular area of the same position and size.

Figure 10:
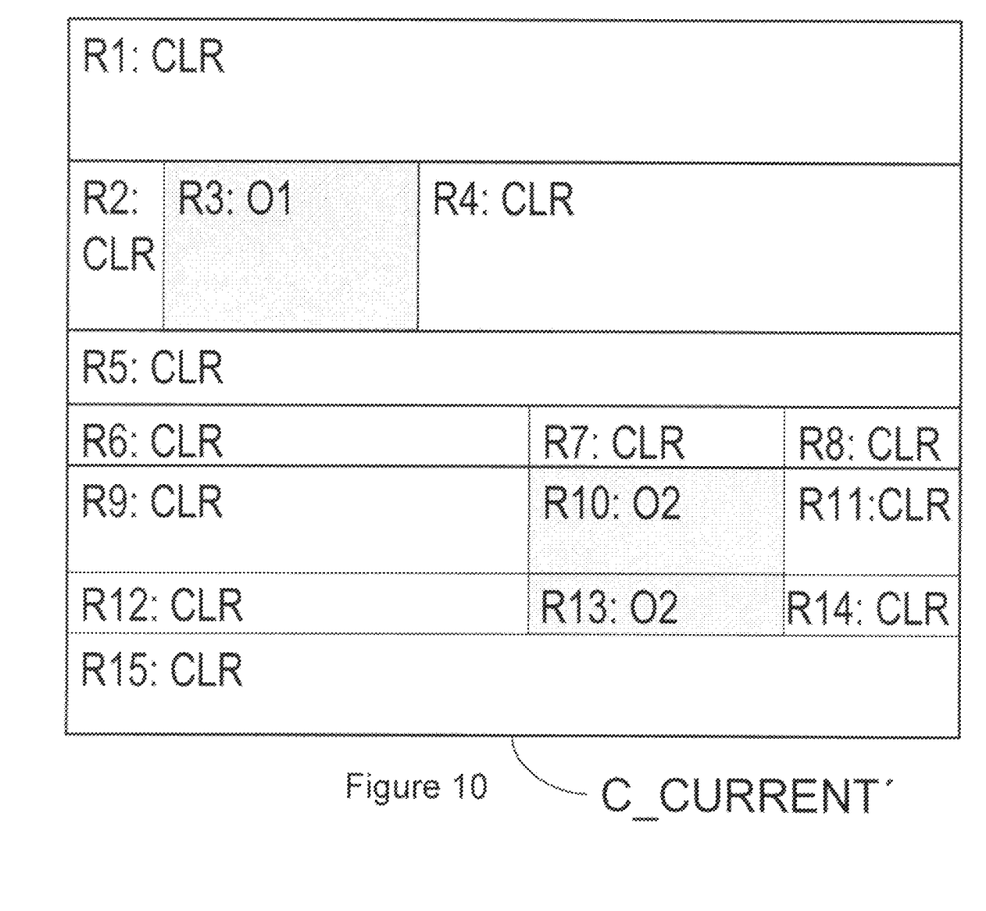
FIG. 10 depicts a modification C_CURRENT' of the exemplary currently presented composition C_CURRENT and FIG. 11 depicts a modification C_NEXT' of the other exemplary next composition C_NEXT.
Figure 11:
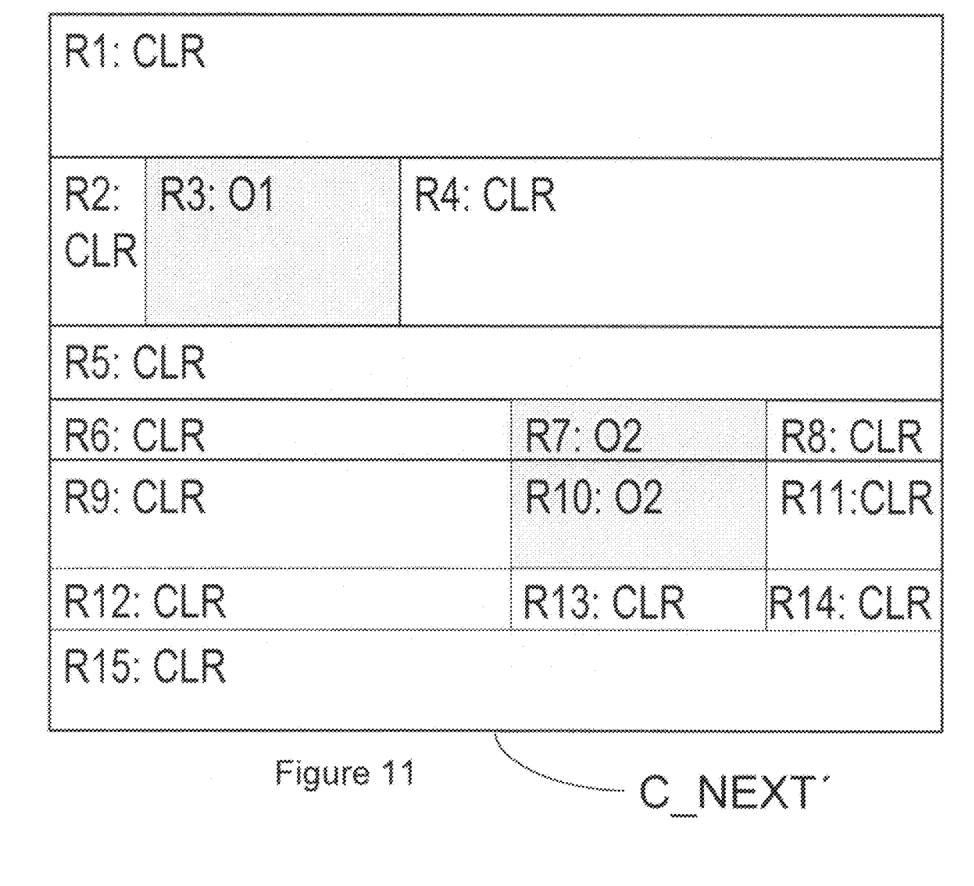

Next, the exemplary renderer compares the modified compositions C_NEXT' and C_CURRENT' by comparing the respective modified RENDER_RECT objects:
For RENDER_RECT object pairs R1 to R4, it had already detected identity
For the RENDER_RECT object pair R5, it detects that they are identical
For the RENDER_RECT object pair R6, it detects that they are identical
For the RENDER_RECT object pair R7, it detects that they are NOT identical.
For the RENDER_RECT object pair R8, it detects that they are identical.
For the RENDER_RECT object pair R9, it detects that they are identical.
For the RENDER_RECT object pair R10, it detects that they are NOT identical.
For the RENDER_RECT object pair R11, it detects that they are identical.

For the RENDER_RECT object pair R12, it detects that they are identical.

For the RENDER_RECT object pair R13, it detects that they are NOT identical.

For the RENDER_RECT object pair R14, it detects that they are identical.

For the RENDER_RECT object pair R15, the renderer detects that they are identical.

The set of RENDER_RECT objects of C_NEXT' for which the exemplary renderer detected that they are not identical to their counterparts in C_CURRENT' is defined as sDIFF. sDiff represents the set of RENDER_RECT objects which need to be executed to produce the desired output. Within the example sDIFF consists of R7, R10 and R13.

The FIGS. 10 and 11 illustrate the areas R7, R10 and R13 to be updated, i.e. the resulting "difference" between the two compositions.

Phase 2:

In the next phase, for each RENDER_RECT object in sDIFF which comprises two or more LAYER objects or a text LAYER object the exemplary renderer performs layer object composition. This is done by execution of the respective RENDER_RECT objects on the back buffer after clearing the respective back buffer area. For text LAYER objects this area is formed by the pixels actually used for presenting the text. Layer object composition results in a set of back buffer areas with composite content which need to be blitted from the back buffer to the front buffer.

Alternatively, the exemplary renderer executes all RENDER_RECT object in sDIFF on the back buffer after clearing the respective back buffer area, irrespectively of the number of LAYER objects comprised in the RENDER_RECT objects. Then, the set of back buffer areas with composite content which need to be blitted is probably larger.

After finishing this phase, the exemplary renderer is prepared to update the front buffer.

Phase 3:

In this subsequent phase, the exemplary renderer updates the front buffer by blitting the set of back buffer areas with composite content from the back buffer to the front buffer. The blitted back buffer areas are not necessarily rectangular, as they may be derived from a text LAYER object. If in phase 2 the alternative approach was used, the front buffer is already up-to-date after blitting. Otherwise, those RENDER_RECT objects in sDIFF which comprise only one LAYER object are executed on the front buffer directly to complete front buffer update. In an exemplary embodiment of the invention, the blitting and executing is performed together according to the position of the respective rectangular areas from left to right and from top to bottom. This reduces tearing artefacts when a screen refresh appears during front buffer update.

Phase 4:

In the final phase of the DISPLAYING state, database housekeeping is performed. This means that the database behind C_NEXT becomes C_CURRENT and that the database behind C_CURRENT is cleared and renamed C_NEXT. The exemplary renderer passes on to the COMPOSITING state afterwards where it is ready to receive displaying commands again.

What is claimed is:

1. A device for presenting an image frame of an image frame sequence by help of displaying commands, wherein each image frame of the sequence is received from a single data source and a displaying command comprises a displaying area and displaying content, the device comprises:

a back buffer for buffering a currently presented full image frame;

a front buffer for buffering a subsequent full image frame to-be-rendered-next;

means for adapting size or shape of rectangular displaying areas of displaying commands of a first displaying command set for displaying the currently presented full image frame or of a second displaying command set for displaying the subsequent full image frame to-be-rendered-next, such that an adapted displaying command set comprises only displaying areas which do not intersect with any displaying area of the same set, and such that the rectangular displaying areas of an adapted displaying command set completely cover an area the image frames are presented on, wherein the means for adapting decomposes the currently presented full image frame and the subsequent full image frame into rendering rectangles, means for determining displaying commands of the adapted second set for displaying the subsequent full image frame to-be-rendered-next, which comprise a displaying area not comprised in any of the displaying commands comprised in the adapted first set for displaying the currently presented full image frame, wherein the device is adapted to execute the determined displaying commands.

2. The device according to claim 1, wherein the determining means are adapted to
  determine whether a displaying command for the same displaying rectangle is comprised in the adapted first set,
  and if so, to determine whether the displaying command of the adapted first set for said same displaying rectangle comprises the same displaying content.

3. The device according to claim 1, wherein the adapting means are suitable for further adaptation of the adapted first displaying command set and of the adapted second displaying command set by:
  formation of an auxiliary set of displaying rectangles, wherein each displaying rectangle of the auxiliary set is a subarea of a displaying rectangle of the adapted first set and a subarea of a displaying rectangle of the adapted second set,
  decomposition of each displaying command of the adapted second set, which is for a displaying rectangle not comprised in the auxiliary set, into a set of displaying commands for displaying rectangles of the auxiliary set, and
  decomposition of each displaying command of the first set, which is for a displaying rectangle not comprised in the auxiliary set, into a set of displaying commands for displaying rectangles of the auxiliary set, and
for each displaying command of the further adapted second set of decomposed displaying commands, the determining means determine only whether the displaying command of the further adapted first set for said same displaying rectangle comprises the same displaying content.

4. The device according to claim 3, further comprising
a database adapted for storing sets of displaying commands, wherein
a section of the database is said back buffer dedicated to the subsequent image frame,
another section of the database is said back buffer dedicated to the preceding image frame,
means for erasing a database section, and
means for exchanging the dedication of the database sections.

5. The device according to claim 1, wherein a composition of an image frame is defined by a set of rendering objects, wherein different rendering objects of the set of rendering objects are not overlapping and the set of rendering objects completely covers the image frame, and wherein each of said rendering objects defines a rectangular subarea and comprises an ordered set of layer objects.

6. The device according to claim 5, wherein each layer object has an associated graphical object and depth position information relating to the graphical object.

7. The device according to claim 5, wherein the set of rendering objects is separated into a first subset and a second subset, the first subset comprising rendering objects that have two or more layers and the second subset comprising rendering objects that have exactly one layer.

8. The device according to claim 1, wherein the device has two main operating states, the main operating states comprising a compositing state and a displaying state, wherein in the operating state the device at least receives displaying commands from an application and makes up a next composition, and in the compositing state the device at least compares the next composition with a current composition.

9. A method for presenting an image frame of an image frame sequence by help of displaying commands, wherein each image frame of the sequence is received from a single data source and a displaying command comprises a displaying area and displaying content, the method comprising steps of:

buffering in an electronic back buffer a currently presented full image frame;

buffering in an electronic front buffer a subsequent full image frame to-be-rendered-next;

decomposing, by electronic adapting means, the currently presented full image frame and the subsequent full image frame into rendering rectangles;

adapting, in said electronic adapting means, size or shape of rectangular displaying areas of displaying commands of a first displaying command set for displaying the currently presented full image frame or of a second displaying command set for displaying the subsequent full image frame to-be-rendered-next, wherein an adapted displaying command set comprises only displaying areas which do not intersect with any displaying area of the same set, and wherein the rectangular displaying areas of an adapted displaying command set completely cover an area the image frames are presented on;

determining, by electronic determining means, displaying commands of the adapted second set for displaying the subsequent full image frame to-be-rendered-next, which comprise a displaying area not comprised in any of the displaying commands comprised in the adapted first set for displaying the currently presented full image frame; and executing the determined displaying commands in the device, whereby the image frame of said image frame sequence is rendered.

* * * * *